United States Patent Office 3,809,750
Patented May 7, 1974

---

3,809,750
METHOD OF TREATING HYPERTENSION IN ANIMALS WITH AN EXTRACT OF BARKS OF ANACARDIACEAE
Yvonne Thuillier, Paris, and Paulette Giono-Barber, born Michel, Crouy-sur-Ourcq, France, assignors to Albert Rolland S.A., Paris, France
No Drawing. Continuation-in-part of abandoned application Ser. No. 56,002, July 17, 1970. This application Sept. 29, 1972, Ser. No. 293,516
Claims priority, application Great Britain, July 19, 1969, 36,427/69
Int. Cl. A61k *27/00, 27/14*
U.S. Cl. 424—195
1 Claim

ABSTRACT OF THE DISCLOSURE

An anti-hypertensive fraction for treatment of animals is extracted from fresh powdered bark of *Anacardium occidentale* L (the cashew tree) by maceration with water in the dark at 0–5° C.

---

The present invention relates to a new extract prepared from the bark of the cashew-tree, *Anacardium occidentale* L, which is also known by the name of *Anacardium senegalensis*. The cashew-tree belongs to the anacardiaceae family which also includes the sumac, the pistachio tree and the turpentine-tree.

*Anacardium occidentale* L or the cashew-tree is a tree of North American origin, but widely planted in Senegal. The fruit, the anacard, cashew or cashew nut, has a certain number of external medical uses, such as the treatment of ulcers and verrucas. The main therapeutic use of the fruit is in topical antileprous treatment. The juice of the mesocarp is allowed to run onto the leprous spots and, antileprous ointments are applied to the artificially produced sores produced by the juice.

The bark contains a gum which exudes if the tree is notched and which solidifies, changing from a red color to a yellow color. This gum is not used in the process of the invention.

It is known from the publication by Costra de Aguiar in the Brazilian review, "Anais da Faculdade de Medecina da Universidade do Recife," volume 18, No. 2, pp. 193–7 (1958), that the bark of *Anacardium occidentale* L contains an agent producing hypoglycaemia. According to this author, the hypoglycaemia-producing properties have been demonstrated in rats treated with an extract from 50 g. of bark in one litre of water, concentrated to 25%, and then diluted to 1/10 with an 8.5% strength solution of physiological serum, the final pH being 7.

We have now surprisingly found, that the bark of *Anacardium occidentale* L possesses an antihypertensive agent that can be extrated by using a process different from that used to extract the hypoglycaemia producing agent.

The present invention provides a process for the preparation of an antihypertensive extract wherein fresh powdered bark of *Anacardium occidentale* L (*Anacardium Senegalensis*), is macerated with water in the dark at a temperature of between 0 and 5° C. and the resulting aqueous extract separated from residual solids.

It is preferred to use distilled water in the maceration and to use a concentration of ground bark of between 20 and 50 g. per litre of distilled water. The aqueous extract is conveniently separated from residual solid by filtration and the aqueous extract then concentrated to give a dry extract which normally comprises 20–30% by weight of the original gum free powdered bark.

The bark, which has been finely powdered in a grinding-sieving device may be suspended in distilled water at a temperature of between 15 and 25° C., with stirring. Thereafter, the maceration is carried out with exclusion of light at a temperature between 0 and 5° C. After maceration, the suspension may be filtered whilst maintaining it at a low temperature, between 0 and 5° C., still with exclusion of light. The filtrate may be concentrated in vacuo and, after standing in darkness at a low temperature, lyophilized.

An extract obtained by dipping the bark in cold water and boiling for some time does not display any anti-hypertensive activity.

The invention relates to the treatment of hypertension, in animals with the extract of the invention. The extract may be administered orally or by injection and the composition will then be liquid, e.g. comprising the extract in an aqueous solution.

The examples which follow are given to illustrate the invention.

EXAMPLE 1

100 g. of bark are ground using a sieving grid, to give 88 g. of a powdered product finer than sawdust. This is suspended in 4.4 l. of distilled water at a temperature of 20° C., giving a concentration of 20 g./l. The mixture is stirred for about 5 minutes and maceration is then allowed to proceed in a cold cabinet at +2° C., with exclusion of light for 48 hours. The mixture is stirred every 2 to 4 hours during the day. After maceration, the mixture is filtered in the cold cabinet at +2° C., still excluding light, through a first filter disc (C5) to give a cloudy liquor and then through a less porous second filter disc EKS 2 to give a limpid pink liquor.

The filtrate, which has a volume of 3.8 liters, has a pH 5.8 and a solids content of 0.68% by weight, i.e. it contains 25.64 g. total solids. The filtrate is concentrated in vacuo on a waterbath at 25° C. until its volume is 380 ml., when the solids content is 6.8% by weight. After standing at +2° C., a precipitate forms. A homogeneous sample is filtered on a folded filter. The precipitate retained on the filter is converted into a brown gummy varnish on warming. The remainder of the solution, having a volume of 320 ml., is lyophilized on plates. 20 g. of a buff-colored product of very low density are obtained.

EXAMPLE 2

90 g. of bark are ground. During grinding, difficulties arise, which may be due to the starting material still being too moist, which results in a slight tendency to carmelise on the grinding apparatus. In this case, two passes without the sieving grid are carried out. The shredded and ground product weighs 90 g. This is suspended in 4.5 l. of distilled water at 20° C., (a concentration of 20 g./l.), with manual stirring for about 5 minutes. Maceration is then allowed to proceed by standing the suspension in a cold cabinet at +2° C., with exclusion of light, for 9 days. The suspension is stirred twice daily for a few minutes. After maceration it is filtered in a cold cabinet at +2° C., still excluding light, through a first filter disc to give a cloudy liquor and then through a less porous second filter disc to give a limpid pink liquor.

The filtrate, which has a volume of 4.2 l., has a pH of 5.25 and a solids content of 0.62% by weight. It is concentrated in vacuo on a waterbath at 25° C. until its volume is 400 ml., when it has solids content of about 6.5% by weight on standing at +2° C.; a precipitate forms. A homogeneous sample is filtered on a folded filter and the precipitate retained on the filter is converted into a brown gummy varnish on warming. The remainder of the solution, having a volume of 320 ml., is lyophilized on plates and 25 g. of a buff-colored product of very low density are obtained.

The extract was studied by two-dimensional chromatography on cellulose powder with a 5 hour migration, using various solvents and dyestuffs to allow the active fraction to be detected.

This fraction is not a protein and contains very little amino acids.

Indole nuclei were detected by, p-dimethylamino-benzaldehyde in N hydrochloric acid solution. Violet-pink spots are observed.

The extract appears not to contain purine derivatives (violet-pink color with eosin), or reducing sugars on their phosphate esters (absence of an orange spot in the presence of picric acid). However, the color of the extract itself renders difficult the determination of certain colors, especially that of the reducing sugars.

However, desoxyribosides, detected by a solution of cystein hydrochloride in 3 N sulphuric acid, very large amounts of thiols, disulphide, compounds containing phosphorus and finally of traces of aminoacids were detected.

No alkaloid reaction was found using the Draggendorf reagent.

The chromatograms of the extract of *Anacardium occidentale* L were compared with those of the renal extract described in British patent specification No. 991,491. The pink spot relating to the presence of indole nuclei of the present extract appears to correspond to the violet spot of the renal extract. The two extracts also show similar spots confirming desoxyribosides. However, the renal extract contains reducing sugars, small amounts of disulphides and no thiols.

The extract according to the invention was subjected to pharmacological tests which demonstrated the antihypertensive properties.

The technique employed was that of Page-Patton-Ogden which involves brushing an exposed kidney with collodion, and removing the opposite kidney 1 to 4 weeks later. This technique theoretically produces chronic hypertensions in ⅔ of the animals operated on.

Wistar rats weighing on average 230 g. at the time of the first operation are used in the test.

Blood pressure is measured in a Giono-Chevillard-Krauthamer oscillometer which allows the arterial pressure to be measured indirectly using the return flow of blood in the distal part of an organ, in this case, the base of the tail of the rat, when the sleeve pressure is released.

The animal is kept for thirty minutes at a temperature of about 30° C. to produce a vasodilatation, the oscillometric sleeve being in position from the start. It is necessary for the animal to be absolutely immobile in order to carry out the measurements, and this sometimes requires a very long wait. An adjoining cage which allows several rats to be kept at 30° C. can be used and results in a considerable saving of time.

The rats are anaesthetised with ether; after making an incision in the skin and the layer of muscle, the kidney is exposed and the conjunctive capsule is then carefully removed without damaging the parenchyma. After carefully drying the kidney, a layer of collodion is applied to the entire surface, the kidney being kept suspended by a thread; several layers are successively applied, and the thread is then cut flush with the parenchyma. 10,000 units of penicillin are injected after the operation and 8,000 units of penicillin on the following day; 10 to 15 days later, the nephrectomy of the untreated kidney is carried out.

A first series of tests was made to show that an extract of *Anacardium occidentale* according to the invention, administered to normal, nonhypertensive rats, does not cause a substantial reduction in the arterial pressure.

A first group of control rats received, by injection, a physiological saline solution; a second group of rats received, by injection, a physiological saline solution containing 50 g./liter of the extract according to the invention, at a dose of 1 mg. per kg. of body weight. The arterial pressure (A.P.) was measured by the oscillometric method [this measurement comprising the systolic pressure (Tm)] and the diastolic pressure (TM) before injection, then 4 to 5 hours after injection. The results are given in Tables Ia and Ib hereinafter, Table Ia giving the results of the measurements for the control rats, and Table Ib the results of the measurements for the rats to which the extract according to the invention had been administered.

A comparison of these tables shows that the arterial pressure, which was close to normal before the treatment, is not modified by the injection of the Anacardium extract.

A second series of tests was made to show the antihypertensive action of an Anacardium extract according to the invention, administered to rats made hypertensive by the Page Patten and Ogden method described hereinabove (experimental hypertension).

The tests were made on three groups of experimentally hypertensive rats, to which a physiological saline solution containing 50 g./liter of the Anacardium extract according to the invention has been administered by injection, at a dose of 1 mg. per kg. body weight. The arterial pressure was measured before injection and four to five hours after injection. The results of these measurements are given for each group of rats in Tables IIa, IIb and IIc respectively. These tables show that the administration of the extract according to the invention provokes a marked reduction in the arterial pressure, ranging from 1 to 3 units for the systolic pressure (Tm) and 2 to 4 units for the distolic pressure (TM). This reduction in pressure, which is confirmed after 5 hours, is maintained for several days after injection.

The following tests are intended to demonstrate the difference existing between the antihypertensive Anacardium extract according to the invention and the hypoglycaemiant Anacardium extract obtained according to the method described by Costa de Aguiar (reference already mentioned). The extract obtained according to the invention is passed over hide powder which is a reagent used by tanners for eliminating tannins; whilst the hypoglycaemiant extract obtained according to de Aguiar retains all its hypoglycaemiant activity after passage over hide powder, the anti-hypertensive extract obtained according to the invention, when it has been free of the tannins by adsorption on hide powder, no longer presents any anti-hypertensive activity, as shown by the following tests.

A physiological saline solution containing 100 g. per litre of the Anacardium extract prepared according to the invention then passed over hide powder, is injected at a dose of 1 mg./kg. of body weight, to two groups of rats, one not hypertensive and the other experimentally hypertensive.

The results of the measurement of the arterial pressure are given in Tables IIIa and IIIb respectively for the hypertensive rats and for the non-hypertensive rats. These tables show:

On the one hand, that the arterial pressure which was close to normal in the nonhypertensive rat is not modified by injection of the product prepared according to the invention and then passed over hide powder;

On the other hand, that the product prepared according to the invention and freed of the tannins by adsorption on hide powder has no antihypertensive activity. Thus, the antihypertensive fraction is contained in the tannin fraction of the extract according to the invention, whilst the hypoglycaemiant fraction of the extract according to de Aguiar is not found in the tannins.

The last series of tests shows the antihypertensive activity of the product prepared according to the invention, administered to experimentally hypertensive rats, at the same dose as the product modified by passage over hide powder in the preceding tests. Three groups of hypertensive rats received by injection, a physiological saline solution containing 100 g./liter of the product prepared according to the invention, at a dose of 1 mg./kg. of body weight.

The results of the measurement of the arterial pressure made before injection, then 4 to 5 hours after the injection, are given for each group in Tables IVa, IVb and IVc respectively.

These tables show that the product prepared according to the invention provokes a marked reduction in the arterial pressure which is from 1 to 3 units for the systolic pressure (Tm) and from 2 to 4 units for the diastolic pressure (TM).

Thus, the product prepared according to the invention has a clear, long-lasting antihypertensive activity.

TABLE Ia

| Rat: | A.P. before injection | | A.P. 4-5 hours after injection | | Effect | |
|---|---|---|---|---|---|---|
| | Tm | TM | Tm | TM | ΔTm | ΔTM |
| 1 | 12 | 14 | 11.5 | 14 | −0.5 | 0 |
| 2 | 12 | 16 | 12 | 16 | 0 | 0 |
| 3 | 10.5 | 13.5 | 10.5 | 13.5 | 0 | 0 |
| 4 | 11.5 | 15 | 11 | 15 | −0.5 | 0 |
| Average | 11.4 | 14.6 | 11.2 | 14.6 | −0.25 | 0 |

TABLE Ib

| Rat | A.P. before injection | | A.P. 4-5 hours after injection | | Effect | |
|---|---|---|---|---|---|---|
| | Tm | TM | Tm | TM | ΔTm | ΔTM |
| 1 | 11 | 14 | 10 | 13 | −1 | −1 |
| 2 | 11 | 15 | 10.5 | 13.5 | −0.5 | −1.5 |
| 3 | 11.5 | 14 | 11 | 14 | −0.5 | 0 |
| 4 | 9 | 11.5 | 9 | 11.5 | 0 | 0 |
| 5 | 13 | 17 | 13 | 17 | 0 | 0 |
| 6 | 9 | 12 | 9 | 12 | 0 | 0 |
| Average | 10.7 | 13.9 | 10.4 | 13.5 | −0.3 | −0.4 |

TABLE IIa

| Rat: | A.P. before injection | | A.P. 4-5 hours after injection | | Effect | |
|---|---|---|---|---|---|---|
| | Tm | TM | Tm | TM | ΔTm | ΔTM |
| 1 | 14 | 19 | 13 | 17 | −1 | −2 |
| 2 | 13 | 17 | 12 | 16 | −1 | −1 |
| 3 | 15 | 19 | 12 | 16 | −3 | −3 |
| 4 | 14 | 17 | 12 | 16 | −2 | −1 |
| 5 | 15 | 20 | 13 | 17 | −2 | −3 |
| Average | 14.2 | 18.4 | 12.4 | 16.4 | −1.8 | −2 |

TABLE IIb

| Rat: | A.P. before injection | | A.P. 4-5 hours after injection | | Effect | |
|---|---|---|---|---|---|---|
| | Tm | TM | Tm | TM | ΔTm | ΔTM |
| 1 | 14 | 19.5 | 12 | 17 | −2 | −2.5 |
| 2 | 13 | 17 | 12 | 15 | −1 | −2 |
| 3 | 15 | 19 | 11 | 15 | −4 | −4 |
| 4 | 15 | 19 | 13 | 16 | −2 | −3 |
| 5 | 18 | 23 | 14 | 18 | −4 | −5 |
| Average | 15 | 19.5 | 12.4 | 16.2 | −2.6 | −3.3 |

TABLE IIc

| Rat: | A.P. before injection | | A.P. 4-5 hours after injection | | Effect | |
|---|---|---|---|---|---|---|
| | Tm | TM | Tm | TM | ΔTm | ΔTM |
| 1 | 13 | 17 | 12 | 15 | −1 | −2 |
| 2 | 13 | 17 | 12 | 14 | −1 | −2 |
| 3 | 15.1 | 19.4 | 14 | 16 | −1.1 | −3.4 |
| 4 | 14 | 19.1 | 13 | 16 | −1 | −3.1 |
| Average | 13.5 | 18.1 | 12.5 | 15.2 | −1 | −2.9 |

TABLE IIIa

| Rat: | A.P. before injection | | A.P. 4-5 hours after injection | | Effect | |
|---|---|---|---|---|---|---|
| | Tm | TM | Tm | TM | ΔTm | ΔTM |
| 1 | 14 | 17 | 14 | 17 | 0 | 0 |
| 2 | 14 | 18 | 14 | 19 | 0 | −1 |
| 3 | 15 | 19 | 15 | 19 | 0 | 0 |
| 4 | 15 | 20 | 15 | 20 | 0 | 0 |
| 5 | 14 | 18 | 14 | 19 | 0 | −1 |
| Average | 14.4 | 18.4 | 14.4 | 18.8 | 0 | −0.4 |

TABLE IIIb

| Rat: | A.P. before injection | | A.P. 4-5 hours after injection | | Effect | |
|---|---|---|---|---|---|---|
| | Tm | TM | Tm | TM | ΔTm | ΔTM |
| 1 | 10 | 14 | 10 | 14 | 0 | 0 |
| 2 | 10 | 13 | 10 | 13 | 0 | 0 |
| 3 | 11.5 | 15 | 11.5 | 14 | 0 | −1 |
| 4 | 10 | 14 | 10 | 14 | 0 | 0 |
| 5 | 9.5 | 13 | 9 | 12 | −0.5 | −1 |
| Average | 10.2 | 13.8 | 10.1 | 13.4 | −0.1 | −0.4 |

TABLE IVa

| Rat: | A.P. before injection | | A.P. 4-5 hours after injection | | Effect | |
|---|---|---|---|---|---|---|
| | Tm | TM | Tm | TM | ΔTm | ΔTM |
| 1 | 16 | 21 | 14 | 16 | −2 | −3 |
| 2 | 14 | 18 | 11 | 16 | −3 | −2 |
| 3 | 13 | 16 | 11 | 15 | −2 | −1 |
| 4 | 13 | 17 | 11 | 14 | −2 | −3 |
| 5 | 13 | 17 | 11 | 14 | −2 | −3 |
| Average | 13.8 | 17.8 | 11.5 | 15.4 | −2.3 | −2.4 |

TABLE IVb

| Rat: | A.P. before injection | | A.P. 4-5 hours after injection | | Effect | |
|---|---|---|---|---|---|---|
| | Tm | TM | Tm | TM | ΔTm | ΔTM |
| 1 | 13 | 18 | 12 | 15 | −1 | −3 |
| 2 | 14 | 19 | 12 | 17 | −2 | −2 |
| 3 | 14 | 19 | 13 | 17 | −1 | −2 |
| 4 | 14 | 18 | 11 | 14 | −3 | −4 |
| 5 | 15 | 20 | 14 | 17 | −1 | −3 |
| 6 | 13 | 16 | 11 | 14 | −2 | −2 |
| Average | 13.8 | 18.6 | 12.1 | 15.6 | −1.7 | −3 |

TABLE IVc

| Rat: | A.P. before injection | | A.P. 4-5 hours after injection | | Effect | |
|---|---|---|---|---|---|---|
| | Tm | TM | Tm | TM | ΔTm | ΔTM |
| 1 | 14 | 18 | 12 | 14 | −2 | −4 |
| 2 | 11.5 | 14.5 | 10 | 12 | −1.5 | −2.5 |
| 3 | 12 | 15 | 10 | 12 | −2 | −3 |
| 4 | 9.5 | 13.5 | 8 | 11 | −1.5 | −2.5 |
| 5 | 14 | 17 | 12.5 | 14.5 | −1.5 | −2.5 |
| Average | 12.2 | 15.6 | 10.5 | 12.7 | −1.7 | −2.9 |

What is claimed is:

1. A method of treating animals suffering from arterial hypertension comprising orally administering to the animal 50 to 100 mg. per day of an extract in an aqueous solution, said extract being prepared by macerating from 20 g. to 50 g. of fresh powdered bark of *Anacardium occidentale* L with 1 liter of water in the dark, at a temperature of between 0 and 5° C., filtering the macerated bark to separate an aqueous extract from the residual solids, concentrating in vacuo at 25° C. the resulting aqueous extract to a solid content of 6.5 to 6.8% by weight, then filtering the concentrated aqueous extract to separate the precipitate formed, and lyophilizing the filtrate to obtain a dry extract having antihypertensive properties.

(References on following page)

References Cited

Anais da Faculdade de Medicina da Universdade do Recife, vol. 18, No. 2, pp. 193–7, 1958.

Martin et al., Remington's Practice of Pharmacy, 11th ed., p. 246, The Mack Publishing Co., Easton, Pa. (1956).

Chemical Abstracts, vol. 10, p. 2786 (1916).

Persinos et al., Journal of Pharmaceutical Sciences, vol. 56, pp. 1512–1515 (1967).

The Dispensatory of U.S.A. 24th ed., pp. 1181–1183 (1947), J. P. Lippincott Co., Phila., Pa.

The Merck Index, 7th ed., 1960, pp. 1010 and 1011. Published by Merck & Co. Inc., New Jersey.

Husa's "Pharmaceutical Dispensing," 6th ed., pp. 630–631, Mack Publishing Co., Easton, Pa. (1966).

Rusby et al., "The Properties and Uses of Drugs," pp. 217–219, Blakiston's Son & Co. Inc., Phila. Pa. (1930).

Dawes et al., Brit. J. Pharmacol. (1950), 5, pp. 65–76.

ALBERT T. MEYERS, Primary Examiner

D. MOYER, Assistant Examiner

U.S. Cl. X.R.

424—180